United States Patent
Li et al.

(10) Patent No.: US 10,229,146 B2
(45) Date of Patent: *Mar. 12, 2019

(54) INDEX MASKING BASED ON INSERT CONTENTION RATIO

(71) Applicant: International Business Machines Corporation, Armonk, NY (US)

(72) Inventors: Shuo Li, Beijing (CN); Ping Liang, Beijing (CN); Xin Ying Yang, Beijing (CN); Jian Wei Zhang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 957 days.

This patent is subject to a terminal disclaimer.

(21) Appl. No.: 14/690,611

(22) Filed: Apr. 20, 2015

(65) Prior Publication Data

US 2016/0306834 A1 Oct. 20, 2016

(51) Int. Cl.
*G06F 7/00* (2006.01)
*G06F 17/30* (2006.01)

(52) U.S. Cl.
CPC .. *G06F 17/30336* (2013.01); *G06F 17/30315* (2013.01); *G06F 17/30377* (2013.01)

(58) Field of Classification Search
CPC .............. G06F 17/30336; G06F 17/30377
USPC ........................................................ 707/715
See application file for complete search history.

(56) References Cited

U.S. PATENT DOCUMENTS

| | | | | |
|---|---|---|---|---|
| 5,666,368 A | * | 9/1997 | Proulx | G01R 31/31853 714/719 |
| 5,781,903 A | * | 7/1998 | Rusterholz | G06F 12/02 382/232 |
| 5,799,184 A | * | 8/1998 | Fulton | G06F 17/30327 |
| 5,806,058 A | | 9/1998 | Mori et al. | |
| 5,860,136 A | * | 1/1999 | Fenner | H03M 7/4006 370/396 |
| 7,487,141 B1 | | 2/2009 | Stephan | |
| 7,917,499 B2 | | 3/2011 | Kleewein et al. | |
| 7,937,375 B2 | | 5/2011 | Wong | |
| 8,626,729 B2 | | 1/2014 | Whitehead et al. | |
| 8,989,113 B2 | * | 3/2015 | Mukherjee | H04W 74/0833 370/329 |
| 2002/0002549 A1 | * | 1/2002 | Lunteren | G06F 17/30985 |
| 2005/0198054 A1 | * | 9/2005 | Sankaran | G06F 1/03 |
| 2009/0157701 A1 | * | 6/2009 | Lahiri | G06F 17/30327 |
| 2014/0201192 A1 | | 7/2014 | Hu et al. | |
| 2014/0233890 A1 | * | 8/2014 | Feder | G02B 6/02123 385/37 |

OTHER PUBLICATIONS

Li et al., "Index Masking Based on Insert Contention Ratio", U.S. Appl. No. 15/066,543, filed Mar. 10, 2016, 2016, 21 pages.

(Continued)

*Primary Examiner* — Binh V Ho
(74) *Attorney, Agent, or Firm* — Alexander G. Jochym

(57) ABSTRACT

Embodiments of the present invention provide a method, computer program product, and computer system for masking indexes. The method may include masking the index if the index contention exceeds a defined threshold. The method may also include configuring the mask type for the index to insert the index without masking. In response to determining that the mask type for the index is configured to insert the index without masking, the index is masked according to a set of rules.

20 Claims, 4 Drawing Sheets

(56) References Cited

OTHER PUBLICATIONS

IBM Appendix P, list of patents or patent applications treated as related, Jul. 18, 2016, 2 pages.

"Methods to minimize data contention in a cluster database system"; An IP.com Prior Art Database Technical Disclosure; IP.com No. 000209837; Aug. 17, 2011; <https://priorart.ip.com/IPCOM/000209837>.

Li et al., "Index Masking Based on Insert Contention Ratio", U.S. Appl. No. 15/380,018, filed Dec. 15, 2016, 23 pages.

Li et al., "Index Masking Based on Insert Contention Ratio", U.S. Appl. No. 15/381,147, filed Dec. 16, 2016, 23 pages.

IBM Appendix P, list of patents or patent applications treated as related, Dec. 16, 2016, 2 pages.

* cited by examiner

US 10,229,146 B2

INDEX MASKING BASED ON INSERT CONTENTION RATIO

BACKGROUND OF THE INVENTION

The present invention relates generally to the field of database indexes, and more particularly to masking database indexes to optimize data insertion speed.

A database index is a data structure that improves the speed of data retrieval operations on a database table at the cost of slower writes and increased storage space. Indexes can be created using one or more columns of a database table, providing the basis for both rapid random lookups and efficient access of ordered records. The disk space required to store the index is typically less than that required by the table (since indexes usually contain only the key-fields according to which the table is to be arranged, and exclude all the other details in the table), yielding the possibility to store indexes in memory for a table whose data is too large to store in memory.

In a relational database, an index is a copy of one part of a table. Some databases extend the power of indexing by allowing indexes to be created on functions or expressions. For example, an index could be created on upper(last_name), which would only store the upper case versions of the last_name field in the index. Another option sometimes supported is the use of "filtered" indexes, where index entries are created only for those records that satisfy some conditional expression. A further aspect of flexibility is to permit indexing on user-defined functions, as well as expression formed from an assortment of built-in functions.

Indexes may be defined as unique or non-unique. A unique index acts as a constraint on the table by preventing duplicate entries in the index and thus the backing table.

Index architectures can be classified as clustered or non-clustered. In non-clustered index architectures, the data is present in random order, but the logical ordering is specified by the index. In clustered index architectures, clustering alters the data block into a certain distinct order to match the index, resulting in the row data being stored in order.

In database management systems, contention refers to multiple processes or instances competing for access to the same index or data block at the same time. In general, this can be caused by very frequent index or table scans, or frequent updates. Concurrent statement executions by two or more instances may also lead to contention, and subsequently busy waiting for the process without the block. The following three solutions are commonly used to reduce contention. First, to reduce contention for table blocks due to delete, select, or update statements, reduce the number of rows per block. This can be done by using a smaller block size. Second, to reduce contention for table blocks due to insert statements, increase the number of freelists, or buffer frames. Third, to reduce contention for index blocks, the best strategy is to implement a Reverse index. The goal of all three solutions is to spread queries over a greater number of blocks to avoid concentrating on any single one.

SUMMARY

A method, computer program product, and computer system for masking indexes comprising: defining, by one or more computer processors, a mask type for an index; determining, by one or more computer processors, that index contention exceeds a defined threshold; determining, by one or more computer processors, that the mask type for the index is configured to insert the index without masking; and in response to determining that the mask type for the index is configured to insert the index without masking, masking the index, based, at least in part, according to a set of rules.

DETAILED DESCRIPTION

Embodiments of the present invention provide systems, methods, and computer program products for masking indexes to improve computer processing speed.

Figure 1:
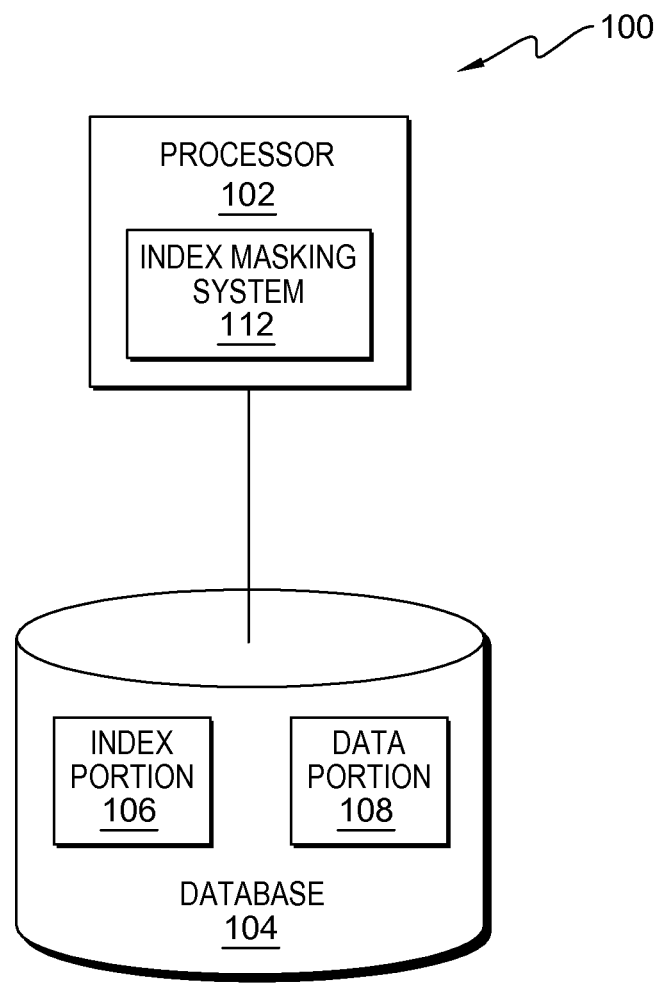
FIG. 1 is a functional block diagram illustrating a computing environment, in accordance with an embodiment of the present invention.

The present invention will now be described in detail with reference to the figures. FIG. 1 is a functional block diagram illustrating a computing environment, generally designated 100, in accordance with one embodiment of the present invention. FIG. 1 provides only an illustration of one implementation, and does not imply any limitations with regard to the environments in which different embodiments may be implemented. Many modifications to the depicted environment may be made by those skilled in the art without departing from the scope of the invention as recited by the claims. In an exemplary embodiment, computing environment 100 includes processor 102, index masking system 112, database 104, index portion 106, and data portion 108.

Processor 102 can be located on or within any of a desktop computer, laptop computer, specialized computer server, or any other computer system known in the art. In certain embodiments, processor 102 is representative of any electronic devices, or combination of electronic devices, capable of executing machine-readable program instructions, as described in greater detail with regard to FIG. 4.

Database 104, in which index masking system 112 masks indexes, can be implemented using any non-volatile storage media known in the art. For example, database 104 can be implemented with a tape library, optical library, one or more independent hard disk drives, or multiple hard disk drives in a redundant array of independent disks (RAID).

Database 104 comprises index portion 106 and data portion 108. Index portion 106 is an area storing an index for accessing data portion 108. Index portion 106 typically stores a plurality of indexes, and each index has a plurality of index records. Indexes within index portion 106 can be partitioned indexes or data partitioned secondary indexes (DPSI). Data portion 108 is a portion of database 104 for storing a large number of data records.

Index masking system 112 can generally include any software capable of masking indexes. In one embodiment of the present invention, database 104 contains index masking system 112. In another embodiment of the present invention, index masking system 112 is a stand-alone system.

Figure 2:
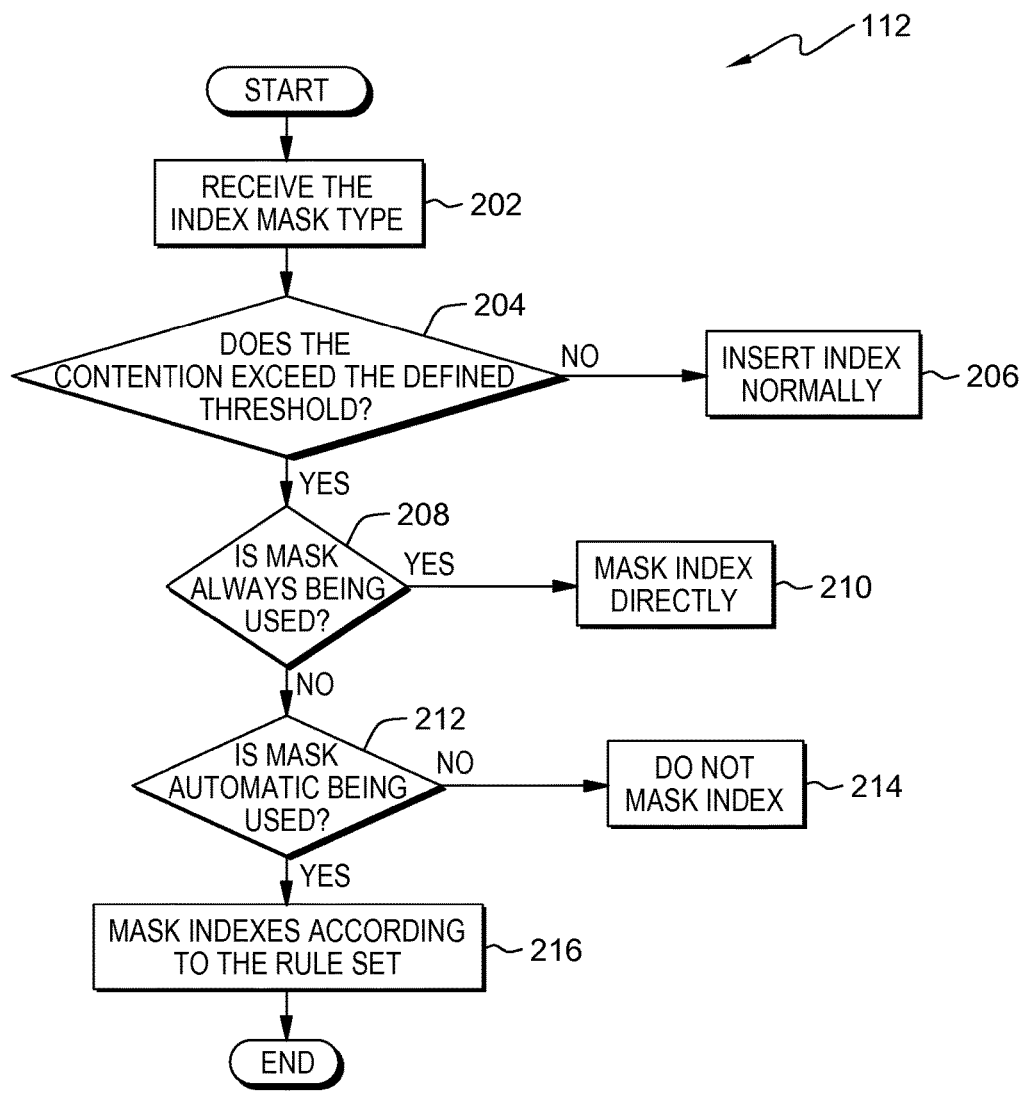
FIG. 2 is a flowchart depicting operational steps of index masking system based on insert contention ratio, in accordance with an embodiment of the present invention.

FIG. 2 is a flowchart depicting the operational steps of index masking system 112 based on insert contention ratio, in accordance with an embodiment of the present invention.

In step 202, index masking system 112 receives index mask type settings. In an exemplary embodiment, the user defines the index mask type as mask never, mask automatic, or mask always. It should be appreciated that only non-unique indexes can be defined as maskable. For example, index 1, index 2, index 3, and index 4 are unique, non-unique, non-unique, and non-unique indexes respectively. Index 1 cannot be masked because it is a unique index, index 2 may be defined as mask never, index 3 may be defined as mask automatic, and index 4 may be defined as mask always.

In step 204, index masking system 112 determines whether the insert contention exceeds the defined threshold. The threshold is predefined based on system requirements. For example, a contention threshold could be preset at 2 milliseconds.

If, in step 204, index masking system 112 determines that the insert contention does not exceed the defined threshold, then in step 206, the masking feature is not initialized and the normal index insert process is performed.

If, in step 204, index masking system 112 determines that insert contention exceeds the defined threshold, then in step 208, system 112 determines whether mask always is being used. In step 208 and 212 index masking system 112 determines which index mask type is used. Index masking system 112 masks the indexes based on the mask type. In an exemplary embodiment, the index mask type can be defined as mask never, mask always, or mask automatic. For mask never, index masking system 112 never masks the index, regardless of whether the insert contention exceeds the defined threshold. For mask always, index masking system 112 always masks the index when the insert contention exceeds the defined threshold. For mask automatic, index masking system 112 masks the index depending on a defined rule set. For example, index 1, index 2, index 3, and index 4 are unique, non-unique, non-unique, and non-unique indexes respectively. Index 1 cannot be masked because it is a unique index, index 2 is defined as mask never and cannot be masked, index 3 is defined as mask automatic, and index 4 is defined as mask always.

If, in step 208, index masking system 112 determines that the index mask type is mask always, then in step 210 index masking system 112 masks the indexes directly. For example, index 4 is non-unique and defined as mask always. Thus, index 4 will always be masked when the insert contention exceeds the defined threshold. When an index is masked, it is not inserted. It should be appreciated that masked indexes are asynchronously materialized by separated daemon threads.

If, in step 208, index masking system 112 determines that the index mask type is not mask always, then in step 212 index masking system 112 determines if mask automatic index type is being used.

If, in step 212, index masking system 112 determines that the index mask type is not mask always, then in step 214 index masking system 112 does not mask the index. In this exemplary embodiment, the index mask type can only be defined as mask never, mask always, or mask automatic. Therefore, if the index mask type is not mask always and not mask automatic, then the index mask type must be mask never.

If index masking system 112 determines that the index mask type is mask automatic, then in step 216 index masking system 112 masks the index according to the rule set. In this exemplary embodiment, the rule set is chosen as a representative, optimized set to support a broad range of systems, and in other embodiments, other rule sets may be chosen based on system requirements. For example, index 3 is non-unique and defined as mask automatic. Thus, when the insert contention exceeds the defined threshold, index 3 will be masked according to the defined rule set. In an exemplary embodiment, the rule set comprises logic to determine whether the index would be masked or not. In one embodiment, the rule set includes the following factors: active applications (apps) in the current environment, index last used time, index contention time, key length, and index free space. The rule set is described in greater detail in the description of FIG. 3.

Accordingly, by performing the operational steps of FIG. 2, the system determines whether there is a high amount of contention (above an acceptable threshold) and then if there is a high contention, performs the appropriate masking techniques. Thus, by repeatedly performing the operational steps of FIG. 2, the contention is continuously reduced and performance is improved over time.

Figure 3:
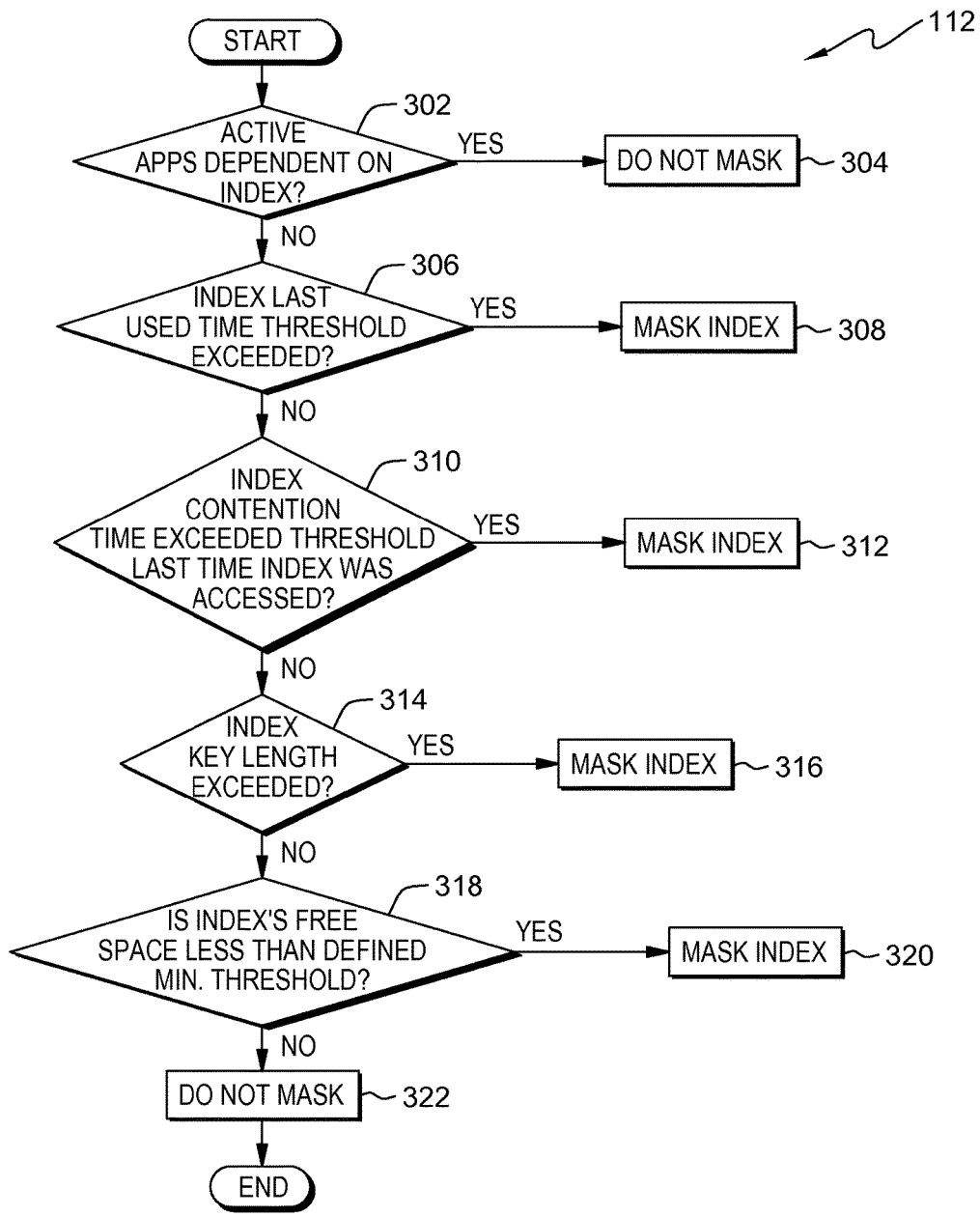
FIG. 3 is a flowchart depicting the operational steps of index masking system applying a rule set, in accordance with an embodiment of the present invention.

FIG. 3 is a flowchart depicting the operational steps of index masking system 112 applying a rule set, in accordance with an embodiment of the present invention. In an exemplary embodiment the rule set includes the following factors: active apps in the current environment, index last used time, index contention time, key length, and index free space. It should be appreciated, however, that any rules suitable to reduce contention time may be used. Moreover, any combination of suitable rules may be used in any suitable order.

In step 302, index masking system 112 determines whether there are any active apps or programs that are dependent on the index. In an exemplary embodiment, an active app or program is one that is open in the current computing environment 100.

If, in step 302, index masking system 112 determines that an active app is dependent on the index, then in step 304 index masking system 112 does not mask the index and the index is inserted normally (i.e., without masking).

If, in step 302, index masking system 112 determines that there are no active apps dependent on the index, then in step 306 index masking system 112 determines if the index last used time threshold is exceeded. In an exemplary embodiment, the index last used time is the time that has elapsed since the index was last used (e.g., 90 days). The older the index last used time is, the less frequently accessed it is, and the less important it is. When there is contention during insert, indexes can be masked with the oldest last used time.

If, in step 306, index masking system 112 determines that the index last used time exceeds the defined threshold, then in step 308, index masking system 112 masks the index directly. For example, if the index has not been used for a certain preset period of time (e.g., 90 days), then the index would be masked directly.

If, in step 306, index masking system 112 determines that the index last used time does not exceed the defined threshold, then in step 310 index masking system 112 determines whether the index contention time exceeded the defined threshold the last time the index was accessed. Index contention time refers to the contention time that occurred the last time the index was accessed. In an exemplary embodiment, the index contention time parameter can be defined as a time (e.g., 2 milliseconds) or as a percentage of central processing unit (CPU) usage (e.g., 1%).

If, in step 310, index masking system 112 determines that the index contention time was exceeded the last time the index was accessed, then in step 312 index masking system 112 masks the index directly. For example, if the index's contention time, or access waiting time, exceeded a preset period of time (e.g., 2 milliseconds) the last time it was accessed, then the index would be masked directly.

If, in step 310, index masking system 112 determines that the index's contention time threshold was not exceeded the last time the index was accessed, then in step 314, index masking system 112 determines whether index key length is exceeded. The index key length is the maximum size of variable-length column(s) plus the size of the fixed-data column(s). The longer the index key is, the more costly the key inserting will be (i.e., increased time to move data). For example, if the index key length exceeds 30% of the total length of all indexes, then the index can be masked directly during spike time (i.e., high volume processing).

If, in step 314, index masking system 112 determines that index key length has exceeded the defined threshold, then in step 316 index masking system 112 masks the index directly.

If, in step 314, index masking system 112 determines that index key length has not exceeded a defined threshold, then in step 318 index masking system 112 determines if the index's free space ratio is less than the defined minimum threshold. In this exemplary embodiment, the index free space ratio refers to the amount of unused storage, or how much storage is available. If the index only has a little space available, a split is more likely to occur and thus cause contention. Typically, a split is the reason for prolonged update time. For example, a split will occur if the leaf page's available space is less than the key length. The leaf page of an index is the lowest level of the index where all of the keys for the index appear in sorted order.

If, in step 318, index masking system 112 determines that the index's free space is less than the defined minimum threshold, then in step 320 index masking system 112 masks the index directly.

If, in step 318, index masking system 112 determines that the index's free space is less than the defined minimum threshold, then in step 322 index masking system 112 does not mask the index, but instead inserts the index normally (without masking). In the exemplary embodiment, an index that has reached step 322 is determined to cause only nominal, or no contention and will be inserted normally.

Figure 4:
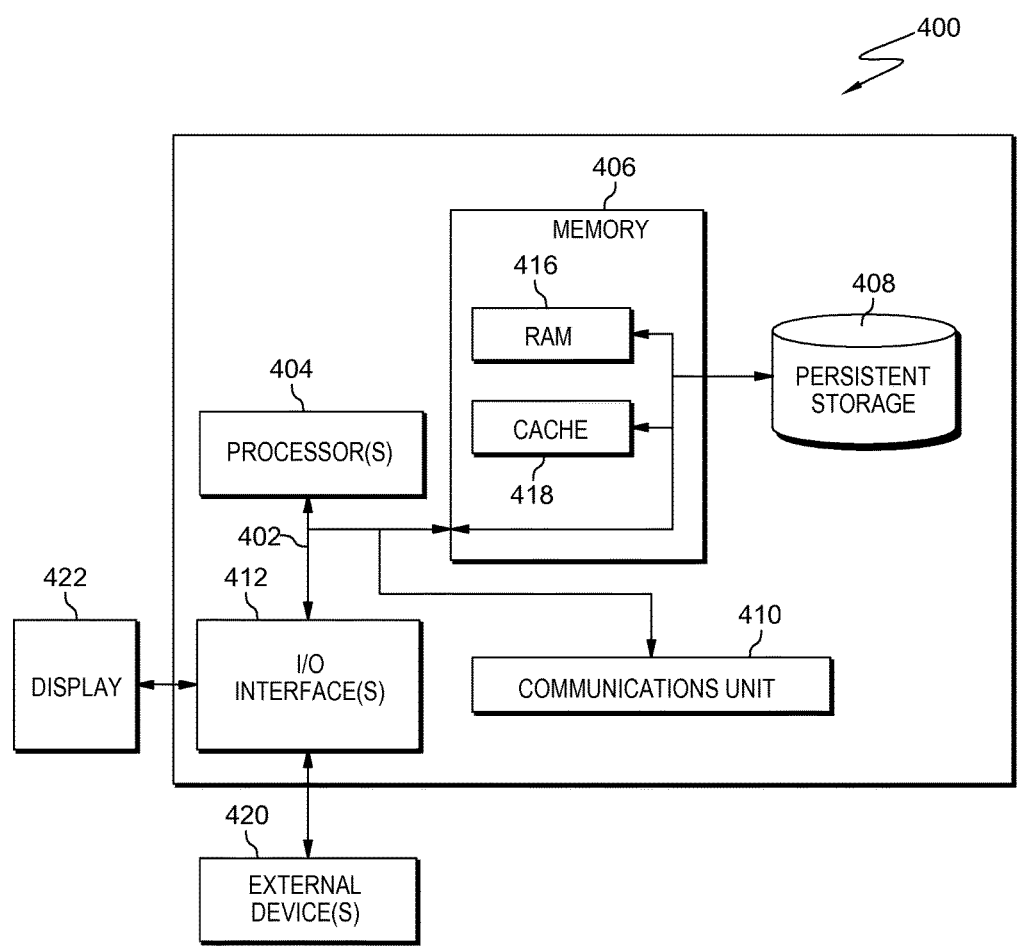
FIG. 4 is a block diagram of internal and external components of a computer system, in accordance with an embodiment of the present invention.

FIG. 4 is a block diagram of internal and external components of computing device 400, which is representative of computing environment 100 of FIG. 1, in accordance with an embodiment of the present invention. It should be appreciated that FIG. 4 provides only an illustration of one implementation and does not imply any limitations with regard to the environments in which different embodiments may be implemented. In general, the components illustrated in FIG. 4 are representative of any electronic device capable of executing machine-readable program instructions. Examples of computer systems, environments, and/or configurations that may be represented by the components illustrated in FIG. 4 include, but are not limited to, personal computer systems, server computer systems, thin clients, thick clients, laptop computer systems, tablet computer systems, cellular telephones (i.e., smart phones), multiprocessor systems, microprocessor-based systems, network PCs, minicomputer systems, mainframe computer systems, and distributed cloud computing environments that include any of the above systems or devices.

Computing device 400 includes communications fabric 402, which provides for communications between one or more processing units 404, memory 406, persistent storage 408, communications unit 410, and one or more input/output (I/O) interfaces 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer-readable storage media. In this embodiment, memory 406 includes random access memory (RAM) 416 and cache memory 418. In general, memory 406 can include any suitable volatile or non-volatile computer readable storage media. Software is stored in persistent storage 408 for execution and/or access by one or more of the respective processors 404 via one or more memories of memory 406.

Persistent storage 408 may include, for example, a plurality of magnetic hard disk drives. Alternatively, or in addition to magnetic hard disk drives, persistent storage 408 can include one or more solid state hard drives, semiconductor storage devices, read-only memories (ROM), erasable programmable read-only memories (EPROM), flash memories, or any other computerreadable storage media that is capable of storing program instructions or digital information.

The media used by persistent storage 408 can also be removable. For example, a removable hard drive can be used for persistent storage 408. Other examples include optical and magnetic disks, thumb drives, and smart cards that are inserted into a drive for transfer onto another computerreadable storage medium that is also part of persistent storage 408.

Communications unit 410 provides for communications with other computer systems or devices via a network. In this exemplary embodiment, communications unit 410 includes network adapters or interfaces such as a TCP/IP adapter cards, wireless Wi-Fi interface cards, or 3G or 4G wireless interface cards or other wired or wireless communications links. The network can comprise, for example, copper wires, optical fibers, wireless transmission, routers, firewalls, switches, gateway computers and/or edge servers. Software and data used to practice embodiments of the present invention can be downloaded to computing device 400 through communications unit 410 (i.e., via the Internet, a local area network, or other wide area network). From communications unit 410, the software and data can be loaded onto persistent storage 408.

One or more I/O interfaces 412 allow for input and output of data with other devices that may be connected to computing device 400. For example, I/O interface 412 can provide a connection to one or more external devices 420 such as a keyboard, computer mouse, touch screen, virtual keyboard, touch pad, pointing device, or other human interface devices. External devices 420 can also include portable computerreadable storage media such as, for example, thumb drives, portable optical or magnetic disks, and memory cards. I/O interface 412 also connects to display 422.

Display 422 provides a mechanism to display data to a user and can be, for example, a computer monitor. Display 422 can also be an incorporated display and may function as a touch screen, such as a built-in display of a tablet computer.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for masking indexes to improve processing performance when multiple processes compete for access to a data block, the method comprising:
defining, by one or more computer processors, a mask type for an index;
determining, by one or more computer processors, that index contention exceeds a defined threshold;
determining, by one or more computer processors, that the mask type for the index is configured to insert the index without masking; and
in response to determining , masking the index, based, at least in part, according to a set of rules.

2. The method of claim 1, further comprising:
determining, by one or more computer processors, that index contention does not exceed a defined threshold; and
inserting, by one or more computer processors, the index without masking.

3. The method of claim 1, further comprising:
determining, by one or more computer processors, that the mask type for the index comprises masking the index; and
masking, by one or more computer processors, the index.

4. The method of claim 1, further comprising:
determining, by one or more computer processors, that the mask type for the index comprises inserting the index without masking; and
inserting, by one or more computer processors, the index without masking.

5. The method of claim 1, wherein the index comprises a partitioned index or a data partitioned secondary index.

6. The method of claim 1, wherein masking the index, based, at least in part, according to a set of rules comprises:
determining, by one or more computer processors, that there are no active applications dependent on the index;
determining, by one or more computer processors, that an index last used time threshold was not exceeded;
determining, by one or more computer processors, that an index contention time does not exceed a defined threshold at an index access time;
determining, by one or more computer processors, that an index key length does not exceed a defined threshold;
determining, by one or more computer processors, that an index free space is more than a defined threshold; and
inserting, by one or more computer processors, the index without masking.

7. A computer program product to improve processing performance by masking indexes when multiple processes compete for access to a data block, the computer program product, the computer program product comprising:
a computer readable storage medium and program instructions stored on the computer readable storage medium, the program instructions comprising:
program instructions to define a mask type for an index;
program instructions to determine that index contention exceeds a defined threshold;
program instructions to determine that the mask type for the index is configured to insert the index without masking; and
in response to determining that the mask type for the index is configured to insert the index without masking, program instructions to mask the index, based, at least in part, according to a set of rules.

8. The computer program product of claim 7, further comprising:
program instructions to determine that index contention does not exceed a defined threshold; and
program instructions to insert the index without masking.

9. The computer program product of claim 7, further comprising:
program instructions to determine that the mask type for the index comprises masking the index; and
program instructions to mask the index.

10. The computer program product of claim 7, further comprising:
program instructions to determine that the mask type for the index comprises inserting the index without masking; and
program instructions to insert the index without masking.

11. The computer program product of claim 7, wherein the index comprises a partitioned index or a data partitioned secondary index.

12. The computer program product of claim 7, wherein the program instructions to mask the index, based, at least in part, according to a set of rules comprises:
program instructions to determine that there are no active applications dependent on the index;
program instructions to determine that an index last used time threshold was not exceeded;
program instructions to determine that an index contention time does not exceed a defined threshold at an index access time;
program instructions to determine that an index key length does not exceed a defined threshold;
program instructions to determine that an index free space is less than a defined threshold; and
program instructions to insert the index with masking.

13. A computer system to improve processing performance by masking indexes when multiple processes compete for access to a data block, the computer system comprising:
one or more computer processors;
one or more computer readable storage media;
program instructions stored on the computer readable storage media for execution by at least one of the one or more computer processors, the program instructions comprising:
program instructions to define a mask type for an index;
program instructions to determine that index contention exceeds a defined threshold;
program instructions to determine that the mask type for the index is configured to insert the index without masking; and
in response to determining that the mask type for the index is configured to insert the index without masking, program instructions to mask the index, based, at least in part, according to a set of rules.

14. The computer system of claim 13, further comprising:
program instructions to determine that index contention does not exceed a defined threshold; and
program instructions to insert the index without masking.

15. The computer system of claim 13, further comprising:
program instructions to determine that the mask type for the index comprises masking the index; and
program instructions to mask the index.

16. The computer system of claim 13, further comprising:
program instructions to determine that the mask type for the index comprises inserting the index without masking; and
program instructions to insert the index without masking.

17. The computer system of claim 13, wherein the index comprises a partitioned index or a data partitioned secondary index.

18. The computer system of claim 13, wherein the program instructions to mask the index, based, at least in part, according to a set of rules comprises:
program instructions to determine that there are no active applications dependent on the index;
program instructions to determine that an index last used time threshold was not exceeded;
program instructions to determine that an index contention time does not exceed a defined threshold at an index access time;
program instructions to determine that an index key length does not exceed a defined threshold;
program instructions to determine that an index free space is more than a defined threshold; and
program instructions to insert the index without masking.

19. The method of claim 1, wherein defining a mask type for an index comprises:
defining, by one or more computer processors, unique indexes as the mask type configured to insert the index without masking;
defining, by one or more computer processors, non-unique indexes as one of: the mask type for the index configured to insert the index without masking, the mask type for the index configured to insert the index with automatic masking based, at least in part, on the set of rules, and a mask type for the index configured to insert the index with masking.

20. The method of claim 1, wherein masking the index, based, at least in part, according to a set of rules comprises:
determining, by one or more computer processors, that there are active applications dependent on the index;
in response to determining there are not active applications dependent on the index, determining, by one or more computer processors, whether a time elapsed since the index was last used exceeds a last time used threshold, inserting, by one or more computer processors, the index normally without masking; and
in response to determining that the time elapsed since the index was last used does exceed the last time used threshold, masking, by one or more computer processors, the index.

* * * * *